US011639419B2

(12) United States Patent
Grayson

(10) Patent No.: US 11,639,419 B2
(45) Date of Patent: May 2, 2023

(54) IODO-FUNCTIONALIZED POLYMERS AS MASS SPECTROMETRY CALIBRANTS WITH A MASS-DEFECT OFFSET

(71) Applicant: THE ADMINISTRATORS OF THE TULANE EDUCATIONAL FUND, New Orleans, LA (US)

(72) Inventor: Scott M. Grayson, New Orleans, LA (US)

(73) Assignee: The Administrators of the Tulane Educational Fund, New Orleans, LA (US)

( * ) Notice: Subject to any disclaimer, the term of this patent is extended or adjusted under 35 U.S.C. 154(b) by 1091 days.

(21) Appl. No.: 16/307,430

(22) PCT Filed: Jun. 5, 2017

(86) PCT No.: PCT/US2017/035952
§ 371 (c)(1),
(2) Date: Dec. 5, 2018

(87) PCT Pub. No.: WO2017/214036
PCT Pub. Date: Dec. 14, 2017

(65) Prior Publication Data
US 2020/0181327 A1   Jun. 11, 2020

Related U.S. Application Data

(60) Provisional application No. 62/346,286, filed on Jun. 6, 2016.

(51) Int. Cl.
| | |
|---|---|
| *C08G 65/337* | (2006.01) |
| *C08G 83/00* | (2006.01) |
| *C08G 69/48* | (2006.01) |
| *C08F 12/22* | (2006.01) |
| *C08F 20/18* | (2006.01) |
| *C08F 20/14* | (2006.01) |
| *C08F 20/56* | (2006.01) |
| *H01J 49/00* | (2006.01) |

(52) U.S. Cl.
CPC ........... *C08G 65/337* (2013.01); *C08F 12/22* (2013.01); *C08F 20/14* (2013.01); *C08F 20/18* (2013.01); *C08F 20/56* (2013.01); *C08G 69/48* (2013.01); *C08G 83/006* (2013.01); *H01J 49/0009* (2013.01)

(58) Field of Classification Search
CPC .... C08G 65/337; C08G 83/006; C08G 69/48; C08F 12/22; C08F 20/18; C08F 20/14; C08F 20/56; H01J 49/0009
See application file for complete search history.

(56) References Cited

U.S. PATENT DOCUMENTS

| | | | |
|---|---|---|---|
| 5,866,100 A | 2/1999 | Tournier et al. | |
| 6,811,771 B1 | 11/2004 | Sugo et al. | |
| 2007/0248547 A1* | 10/2007 | Brasch | C08G 71/04 424/9.322 |
| 2013/0231604 A1 | 9/2013 | Jones et al. | |
| 2015/0132854 A1 | 5/2015 | Grayson | |
| 2020/0090917 A1 | 3/2020 | Grayson | |

FOREIGN PATENT DOCUMENTS

| | | |
|---|---|---|
| CN | 104645356 A | 5/2015 |
| EP | 0619121 A2 | 10/1994 |
| WO | 2013177223 A | 11/2013 |

OTHER PUBLICATIONS

International Search Report of International Patent Application No. PCT/US2017/035952 dated Aug. 11, 2017.
European Search Report for Application 17810787.6 dated Jun. 29, 2020.
"Supporting information Controlled RAFT Polymerization and Zinc Binding Performance of Catechol-Inspired Homopolymers", Jan. 1, 2014.
Anna Isakova et al.: "Controlled RAFT Polymerization and Zinc Binding Performance of Catechol-Inspired Homopolymers", Macromolecules, (2014), vol. 47, No. 8: 2561-2568.

\* cited by examiner

*Primary Examiner* — Robert D Harlan
(74) *Attorney, Agent, or Firm* — McBee Moore & Vanik IP, LLC

(57) ABSTRACT

The present invention discloses novel calibrants containing between 1 and 5 iodine atoms and methods of making them using linear polymers, hyperbranched polymers, and biological polymers (including but not limited to proteins and peptides.) Methods of using the calibrants are also disclosed, such as mass spectrometry. The novel calibrants disclosed herein have a more cost- and time-efficient synthesis than other calibrants.

13 Claims, 17 Drawing Sheets

| Element | Isotope | Atomic Mass (u) | Mass defect | Isotopic comp. (%) | Mass def. per 1000u |
|---|---|---|---|---|---|
| Hydrogen | $^1$H | 1.00783 | 0.00783 | 99.9885 | 7.7692 |
|  | $^2$H | 2.01410 | 0.01410 | 0.0115 | 7.0065 |
| Carbon | $^{12}$C | 12.00000 | 0.00000 | 98.93 | 0.0000 |
|  | $^{13}$C | 13.00335 | 0.00335 | 1.07 | 0.2576 |
| Nitrogen | $^{14}$N | 14.00307 | 0.00307 | 99.632 | 0.2192 |
|  | $^{15}$N | 15.00011 | 0.00011 | 0.368 | 0.0073 |
| Oxygen | $^{16}$O | 15.99491 | -0.00509 | 99.757 | -0.3182 |
|  | $^{17}$O | 16.99913 | -0.00087 | 0.038 | -0.0512 |
|  | $^{18}$O | 17.99916 | -0.00084 | 0.205 | -0.4667 |
| Fluorine | $^{19}$F | 18.99840 | -0.00160 | 100 | -0.0842 |
| Phosphorus | $^{31}$P | 30.97377 | -0.02623 | 100 | -0.8468 |
| Sulfur | $^{32}$S | 31.97207 | -0.02793 | 94.93 | -0.8736 |
|  | $^{33}$S | 32.97146 | -0.02854 | 0.76 | -0.8656 |
|  | $^{34}$S | 33.96787 | -0.03213 | 4.29 | -0.9459 |
| Chlorine | $^{35}$Cl | 34.96885 | -0.03115 | 75.78 | -0.8908 |
|  | $^{37}$Cl | 36.96885 | -0.03419 | 24.22 | -0.9248 |
| Bromine | $^{79}$Br | 78.91834 | -0.08166 | 50.69 | -1.0347 |
|  | $^{81}$Br | 80.90585 | -0.08371 | 49.31 | -1.0347 |
| Iodine | $^{127}$I | 126.93032 | -0.09553 | 100 | -0.7526 |

FIG. 7

IODO-FUNCTIONALIZED POLYMERS AS MASS SPECTROMETRY CALIBRANTS WITH A MASS-DEFECT OFFSET

CROSS-REFERENCE TO RELATED APPLICATIONS

This application is a National Stage entry of International Application No. PCT/US2017/035952, filed 05 Jun. 2017, which claims priority to U.S. Provisional Application No. 62/346,286, filed 06 Jun. 2016.

BACKGROUND OF THE INVENTION

Field

The present invention relates to calibrants and methods of making them using at least one iodo functional group and linear polymers, hyperbranched polymers, and/or biological polymers (including but not limited to proteins and peptides).

Description of Related Art

Matrix assisted laser desorption ionization (MALDI) (Karas et al. 1985) and electrospray ionization (ESI) (Dole et al. 1968; Yamashita et al. 1984) mass spectrometry (MS) were developed as soft ionization techniques suitable for very large molecular weight ions. These two ionization techniques in combination with time-of-flight (TOF) mass analyzers have provided a means of characterizing analytes with a molecular weight as high as one million (Schreimer & Li 1996). Because TOF instruments use the flight time of a given analyte from ion extraction at the source to ion impact at the detector to determine m/z, any alteration to the ionization conditions or acquisition parameters can affect the observed time of flight, and therefore the determined m/z. As a result, precise and regular calibration is required to provide highly accurate mass values.

Current calibrants for TOF MS systems include peptides, proteins, ion clusters (Pleasance et al. 1991; Anacleto et al. 1992; Hop 1996; Moini et al. 1998; Konig & Fales 1999) and polydisperse synthetic polymers (McEwen & Larsen 1992; Cody et al. 1992). Although each can generate an accurate and precise mass scale, each also exhibits at least one significant drawback including high cost, instability, limited mass range, and potential signal overlap with analyte. Recently, polyester-based dendrimers have been proposed as an attractive alternative for MS calibration due to their efficient synthesis, high purity, broad molecular mass range and true monodispersity (Grayson et al. 2014; Casey & Grayson 2015; Gross 2016). Additional practical advantages, such as broad compatibility with MALDI matrices and extended shelf-lives, have led to their commercialization.

With the growing potential of mass spectrometry for the rapid screening of peptides and proteins, the use of internal calibrants is particularly appealing for maximizing mass accuracy and thereby improving peptide identification. However, most biological and synthetic macromolecular calibrants consist predominately of H, C, N, and O, which all exhibit a mass defect that is either positive or negligibly negative. As a result, these calibrants exhibit a similar positive mass defect to those expected for biological analytes, increasing the likelihood that the analyte signal might be obscured, shifted, or misidentified because of a nearby or overlapping calibrant signal. An ideal internal calibrant set would have a mass defect signature that clearly differentiates it from the majority of peptide analytes. Mass-defect labeling has been explored to tag peptide analytes (Yao et al. 2008; Bajrami et al. 2009); however, the concept of incorporating a mass defect label into a calibrant has only been demonstrated to date by the inclusion of multiple fluorine atoms into calibrants (Fishman et al. 2001). However, while the negative mass defect of multiple fluorine atoms can provide contrast relative to the positive mass defect observed in most synthetic or biological polymers, a significant number of fluorine atoms (greater than 100) would be required to maximize the mass-defect offset relative to common analytes. An attractive alternative is the incorporation of iodine, which exhibits a much larger negative mass defect (Shi et al. 2009), nearly 60 times greater per atom than F. In order to design calibrants with an optimized mass defect, the mass-defect distributions among natural peptides were first calculated, and this data set used to identify tris-iodinated cores as the ideal initiating groups for the synthesis of dendrimer-based mass-defect calibrants.

For rapid screening of unknown proteomic and peptidomic analytes, internal calibrants can assure optimal mass accuracy; however, they should be designed to minimize the likelihood that a calibrant peak might obscure, or be confused with the analyte. The concept of "averagine" was proposed in order to model the average composition of an amino acid residue: $C_{4.9384}H_{7.7583}N_{1.3577}O_{1.4773}S_{0.0417}$. The averagine concept can also be used as a tool to identify the most populated mass defect associated with any nominal mass. In this case of averagine with a mass of 111.05431, it is comprised of a Nominal Mass of 110.9981 and a mass defect of 0.0562055. To aid in our calibrant design, we propose the concept of "scarcine." If averagine traces the most common mass defect for a given nominal mass (for a given population of compounds, such as peptides), then scarcine is the least common mass defect for a given nominal mass. To better define the targets for a mass-defect calibrant, we have mapped the population of all peptides (MW 0-2400) with respect to their nominal mass and mass defect (see FIGS. 5 and 6.) While the nominal mass of each possible peptide is measured on the x-axis and its corresponding mass defect is measured on the y-axis, the z-axis represents the population of peptides with that specific mass (the population values calculated for a 1 u width in the nominal mass, and a 0.01 u width in the mass defect). It should be noted that these initial population calculations were determined assuming an unbiased statistical incorporation of the 20 most common proteinogenic amino acids residues, rather than the actual frequency of occurrence, and without taking into consideration the effect of post-translational modifications.

Described are novel dendritic calibrants disclosed in PCT/US2013/042110, which is hereby incorporated by reference in its entirety. Practical advantages of dendritic calibrants include the following: 1) the improved resolution that results from stable structure and consistent mode of ionization; 2) an extended shelf-life due to stability to degradation (oxidation, hydrolysis, etc.); 3) broad solvent capability (Hexane, $CH_2Cl_2$, ethyl acetate, acetone, MeOH, EtOH, $CH_3CN$, DMSO; and 4) unprecedented compatibility with matrices (Azathiothiamine, DCTB, CHCA, DHB, DHAP, Dithranol, Galvinoxyl free radical, graphite, HABA, MBT, NALDI, 9-Nitroanthrecene, Sinapinic acid).

SUMMARY OF THE INVENTION

The present invention discloses other novel calibrants and methods of making them using linear polymers, hyperbranched polymers, and biological polymers (including but not limited to proteins and peptides.) These novel calibrants are cheaper to make than dendrimers, though they exhibit a range of molecular weights rather than the single, discrete molecular weight associated with a given dendrimer.

The calibrants are used for mass spectrometry as well as other applications. These compounds are easy to prepare in gram quantities, yet are required in microgram quantities for mass spectrometry calibration. The analysis of proteins and peptide biomarkers for diseases within patient samples (e.g., blood or urine) is one method that can be used with this technology to rapidly screen for biological markers that can provide insight into a patient's health.

The attachment of a moiety bearing 1-5 iodo functional groups onto a linear or hyperbranched polymer enables the product to be used as a mass-spectrometry mass-defect calibrant. Specifically, the inclusion of three iodine groups provides a mass defect that is offset by 0.5 mass units relative to the most common mass defect associated with peptides and proteins. As a result, these calibrants can be used as internal calibrants—mixed with an unknown analyte—while minimizing the likelihood of signal overlap between the unknown analyte and the calibrant. This approach, the attachment of a tri-iodo moiety onto a macromolecular calibrant, works equally well with linear polymers, hyperbranched polymers, and biological polymers (including but not limited to proteins and peptides.)

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the invention illustrated and in its operation may be made without departing in any way from the spirit of the present invention. No feature of the invention is critical or essential unless it is expressly stated as being "critical" or "essential."

BRIEF DESCRIPTION OF THE DRAWINGS

The following drawings form part of the present specification and are included to further demonstrate certain aspects of the present invention. The invention may be better understood by reference to one or more of these drawings in combination with the description of specific embodiments presented herein.

FIG. 7 shows the mass-defects of common non-metal elements. Elements with a negative mass defect can be used to mass-label a calibrant such that it can be easily distinguished from common biological analytes. The ideal properties for a mass-defect tuning element are 1) ease of incorporation into stable organic compounds; 2) narrow isotopic distribution (ideally monoisotopic); and 3) substantial negative mass defect. Although there are many elements that can be employed to tune mass defect, iodine is particularly attractive if the magnitude of defect is important.

In FIG. 8, F3 represents trifluoroethanol, F7 represents heptafluorobutanol, and F15 represents pentadecafluorooctanol. In FIG. 8, I1 represents 4-iodophenol, I2 represents 2,4-diiodophenol, and I3 represents 2,4,6-triiodophenol.

DETAILED DESCRIPTION OF THE INVENTION

Figure 1:
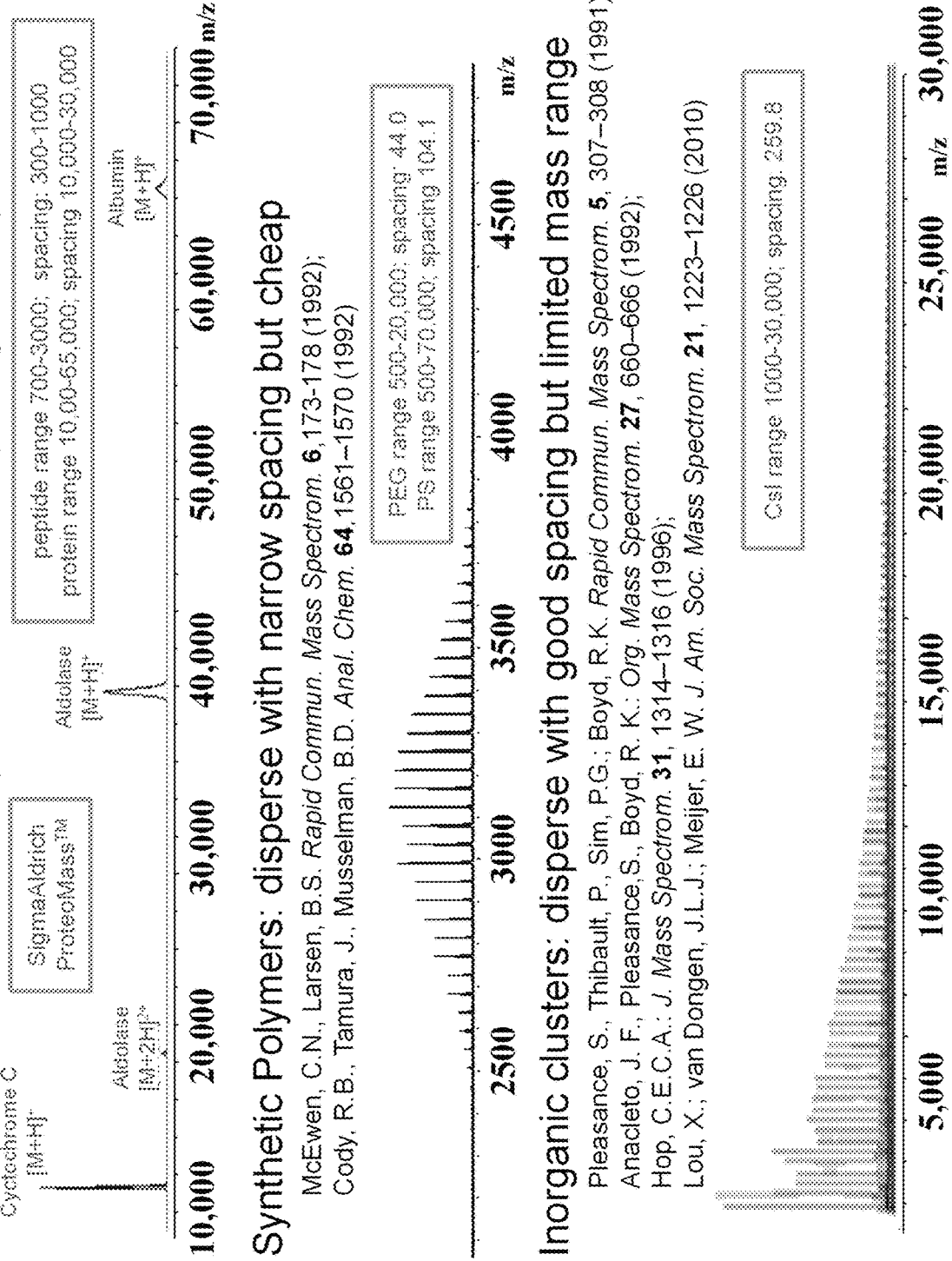
FIG. 1 shows mass distribution features of common calibrants. The ideal calibrant should provide numerous appropriately spaced signals over a wide mass range.
Figure 2:
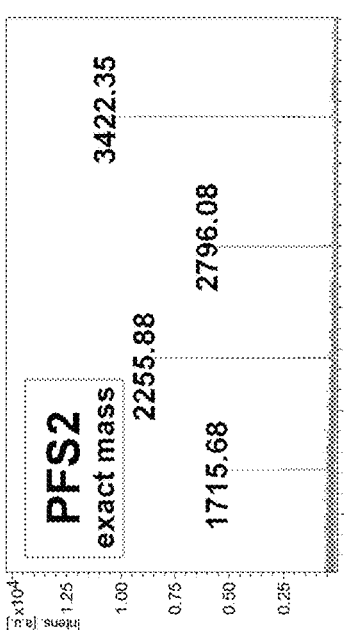
FIG. 2 shows a comparison of dendrimer mixtures as calibrants.
Figure 2:
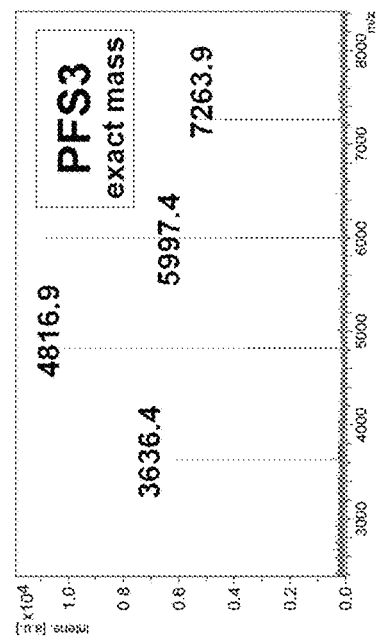
Figure 2:
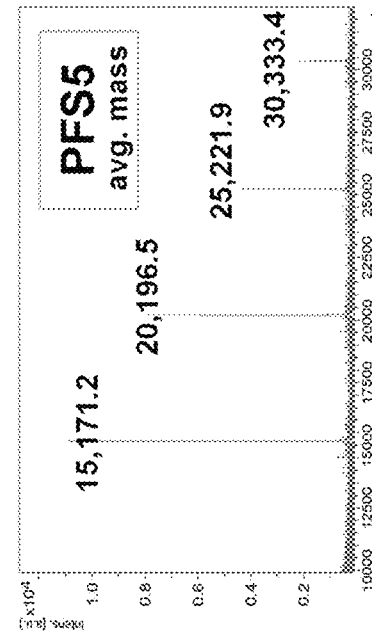
Figure 2:
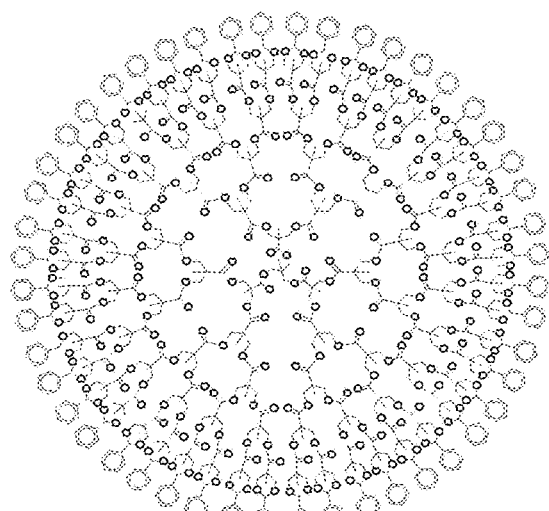
Figure 2:
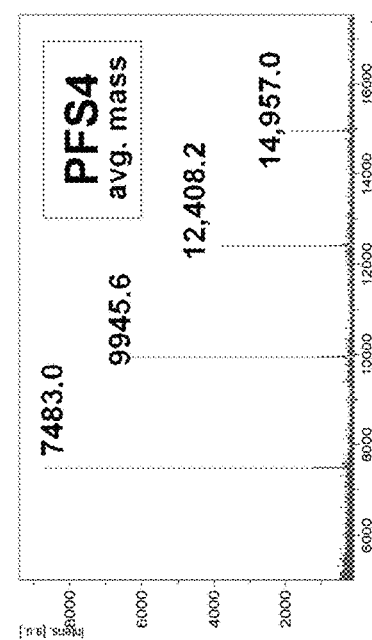
Figure 3:
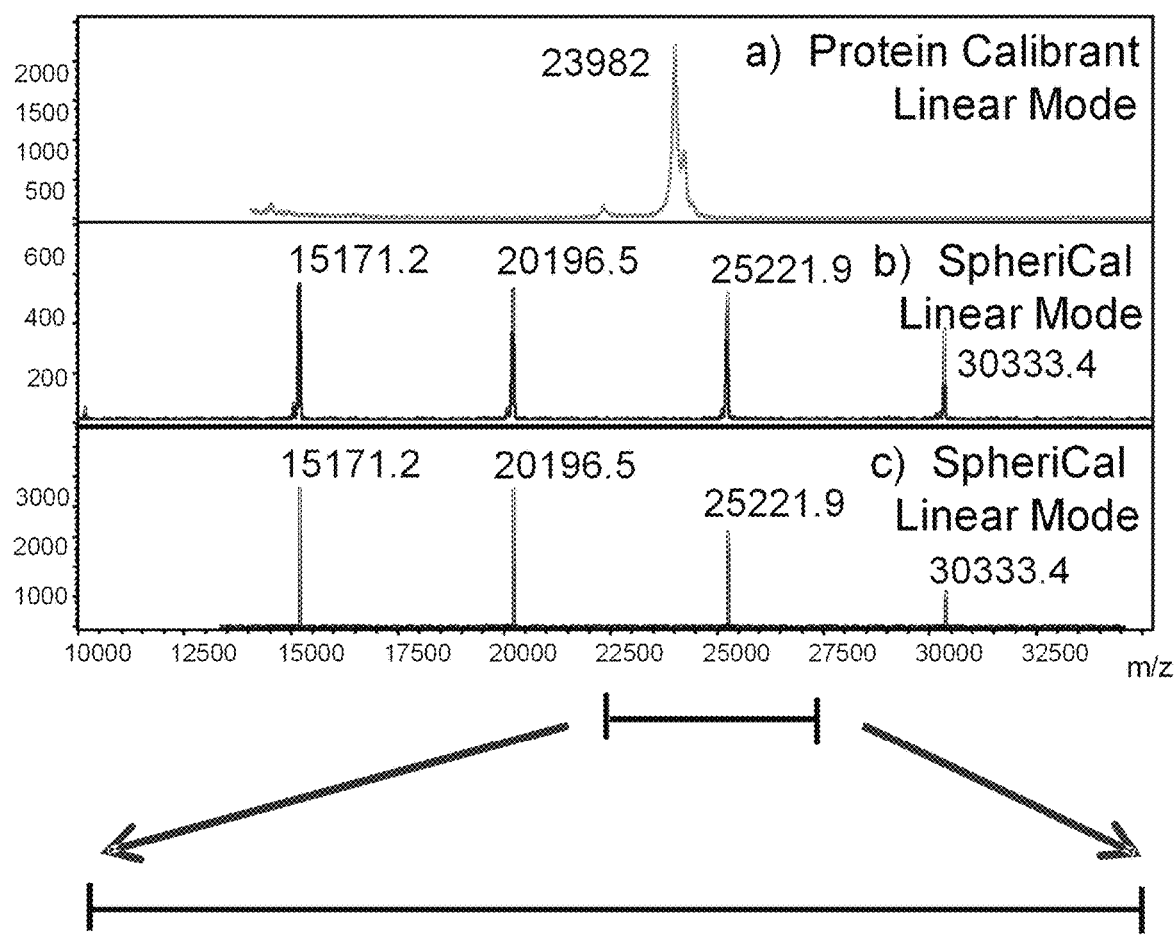
FIG. 3 shows one advantage of dendritic calibrants: the improved resolution results from stable structure and consistent mode of ionization.
Figure 3:
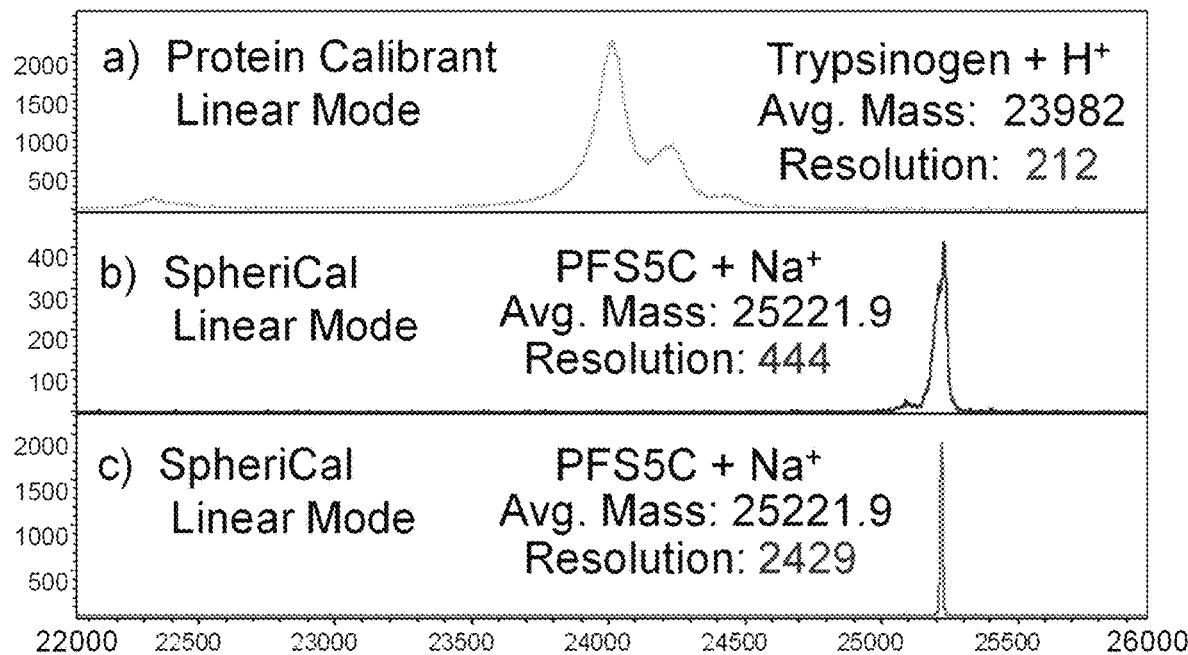
Figure 4:
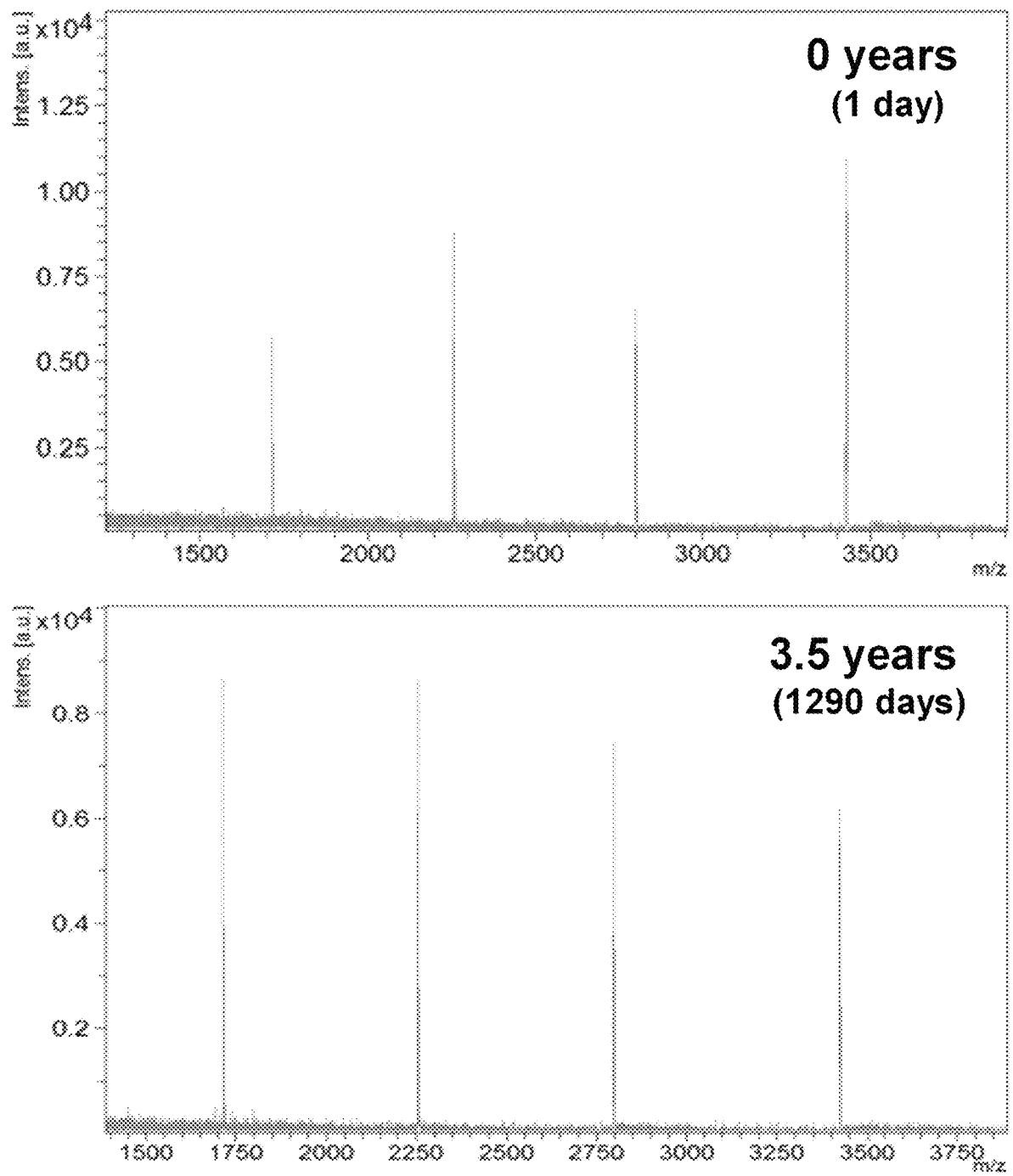
FIG. 4 shows another advantage of dendritic calibrants: extended shelf-life due to stability to degradation (oxidation, hydrolysis, etc.). The calibrant was stored at ambient conditions: room temperature, and exposed to oxygen and light.
Figure 5:
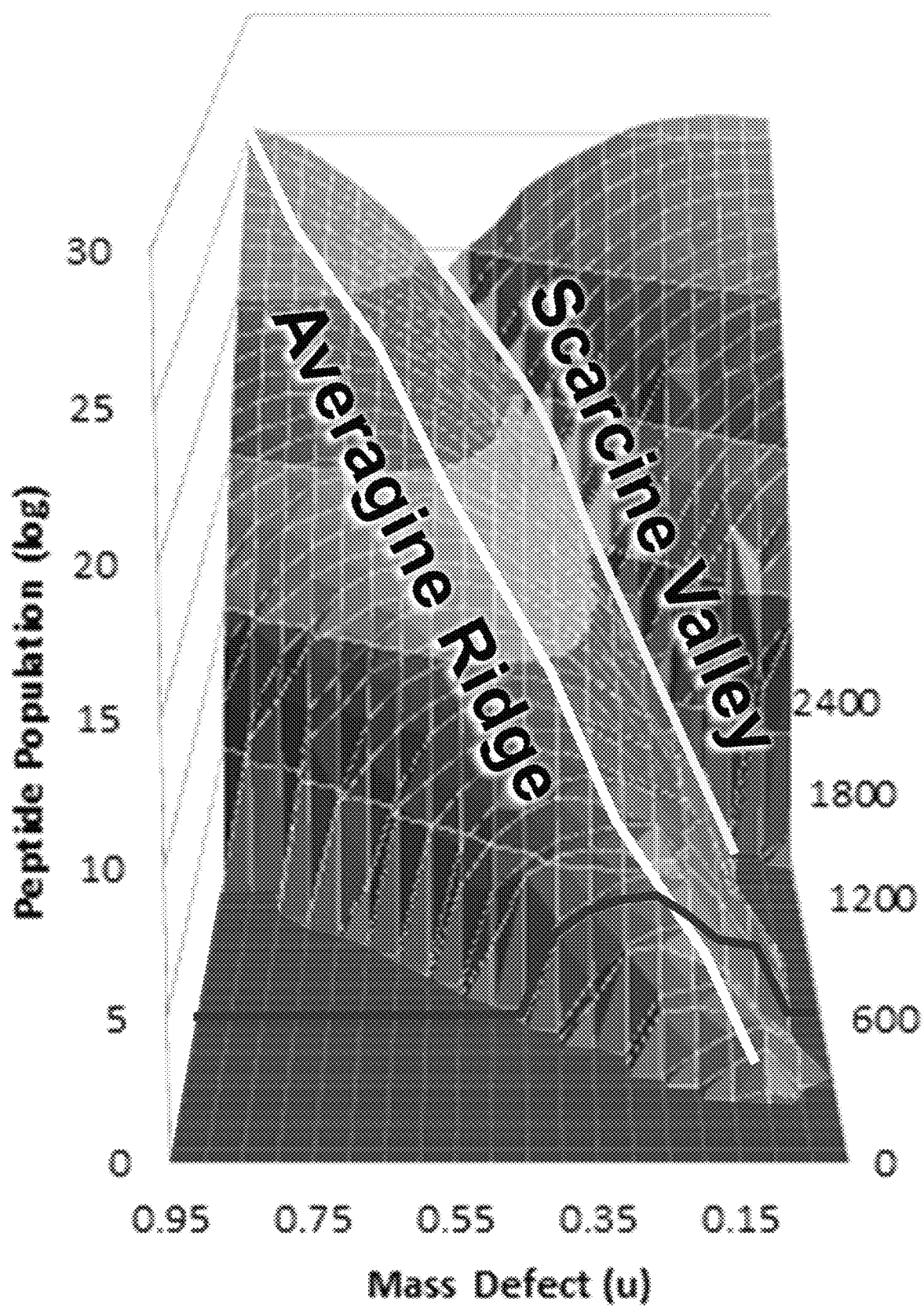
FIG. 5 shows the population maps of peptides: mass defect v. nominal mass. "Averagine Ridge" is the most populated mass-defect trend. "Scarcine Valley" is the least populated mass-defect trend. To minimize overlap with unknown analytes, an internal calibrant should fall in the "scarcine valley".
Figure 6:
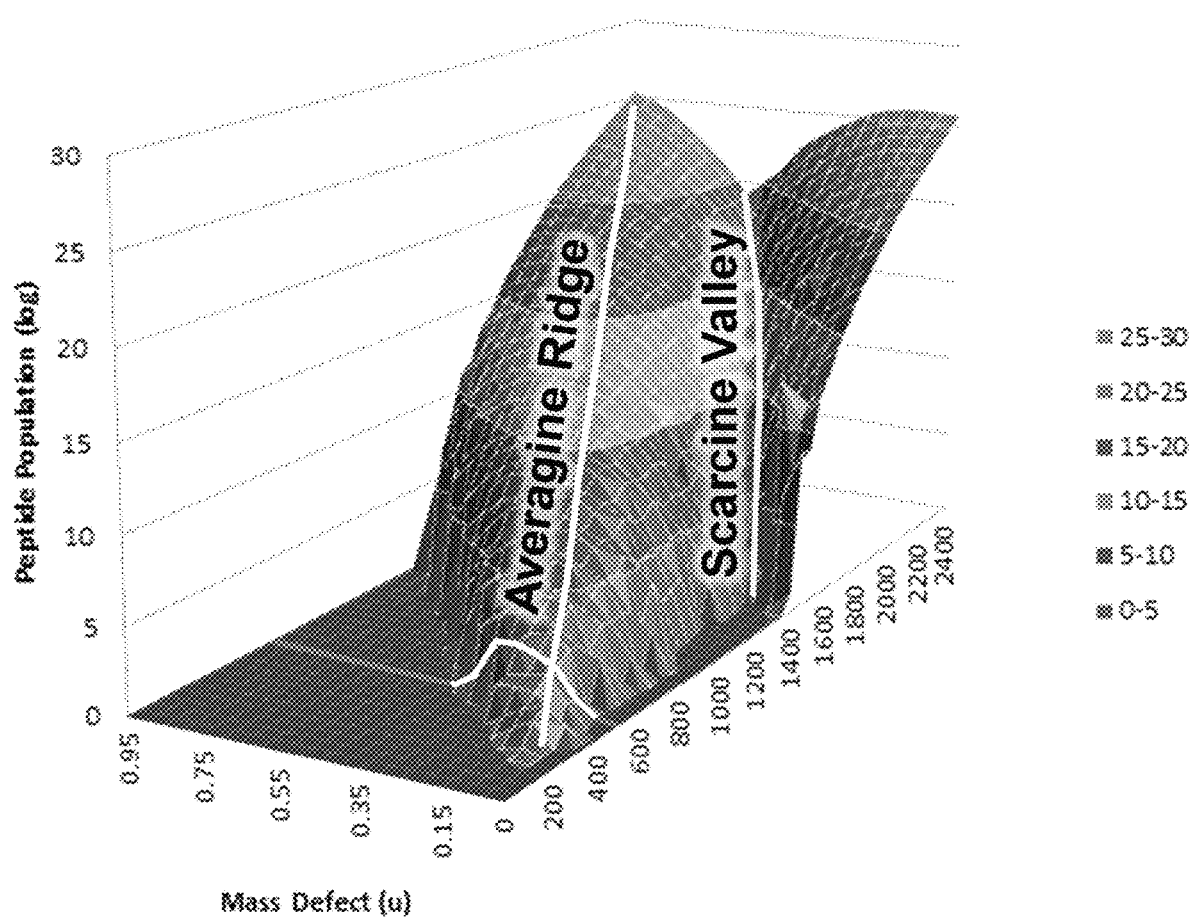
FIG. 6 shows an alternative view of the population maps of peptides: mass defect v. nominal mass. "Averagine Ridge" is the most populated mass-defect trend. "Scarcine Valley" is the least populated mass-defect trend. To minimize overlap with unknown analytes, an internal calibrant should fall in the "scarcine valley".
Figure 8:
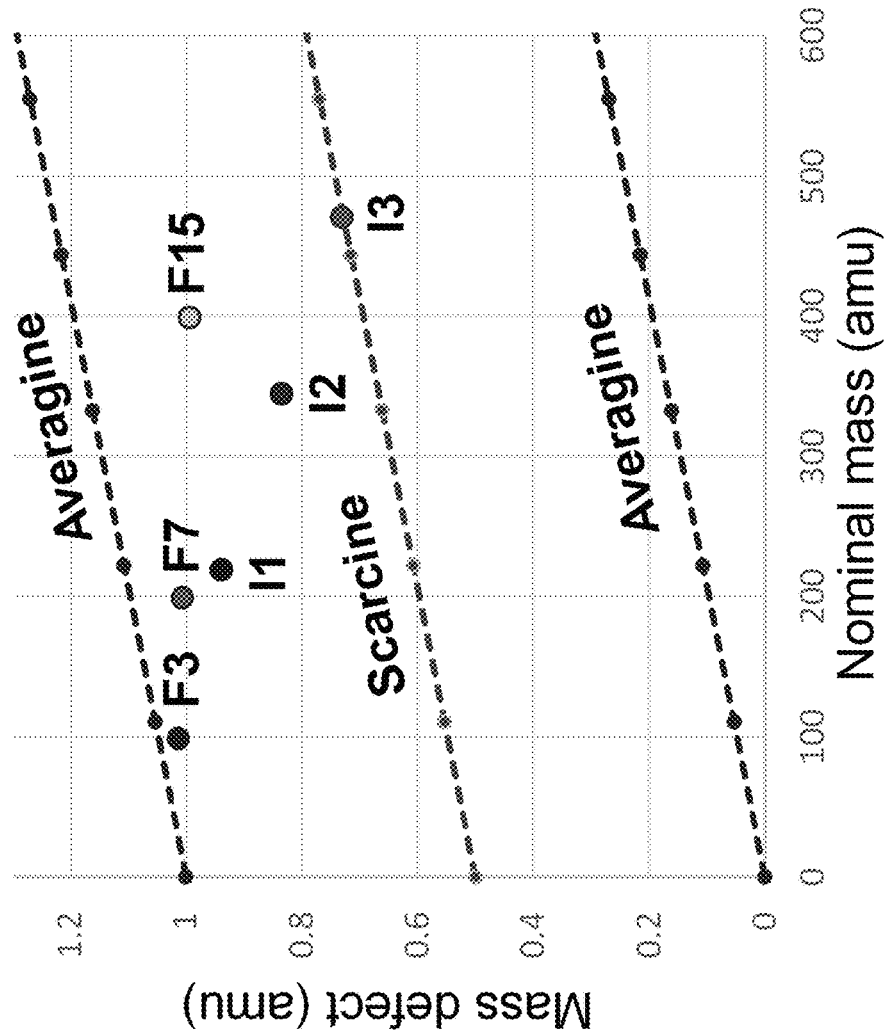
FIG. 8 shows a number of candidate negative mass-defect cores and highlights why triiodo compounds are most appealing. While fluorine exhibits a negative mass defect, the mass-defect offset is small. Iodine has a substantial mass-defect offset, such that the incorporation of just three iodine atoms provides the ideal mass-defect offset (0.5 u).
Figure 8:
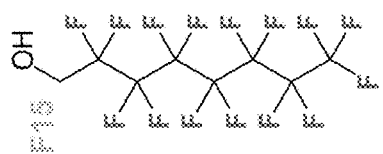
Figure 8:
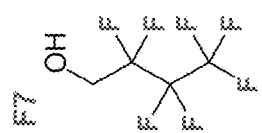
Figure 8:
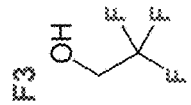
Figure 9:
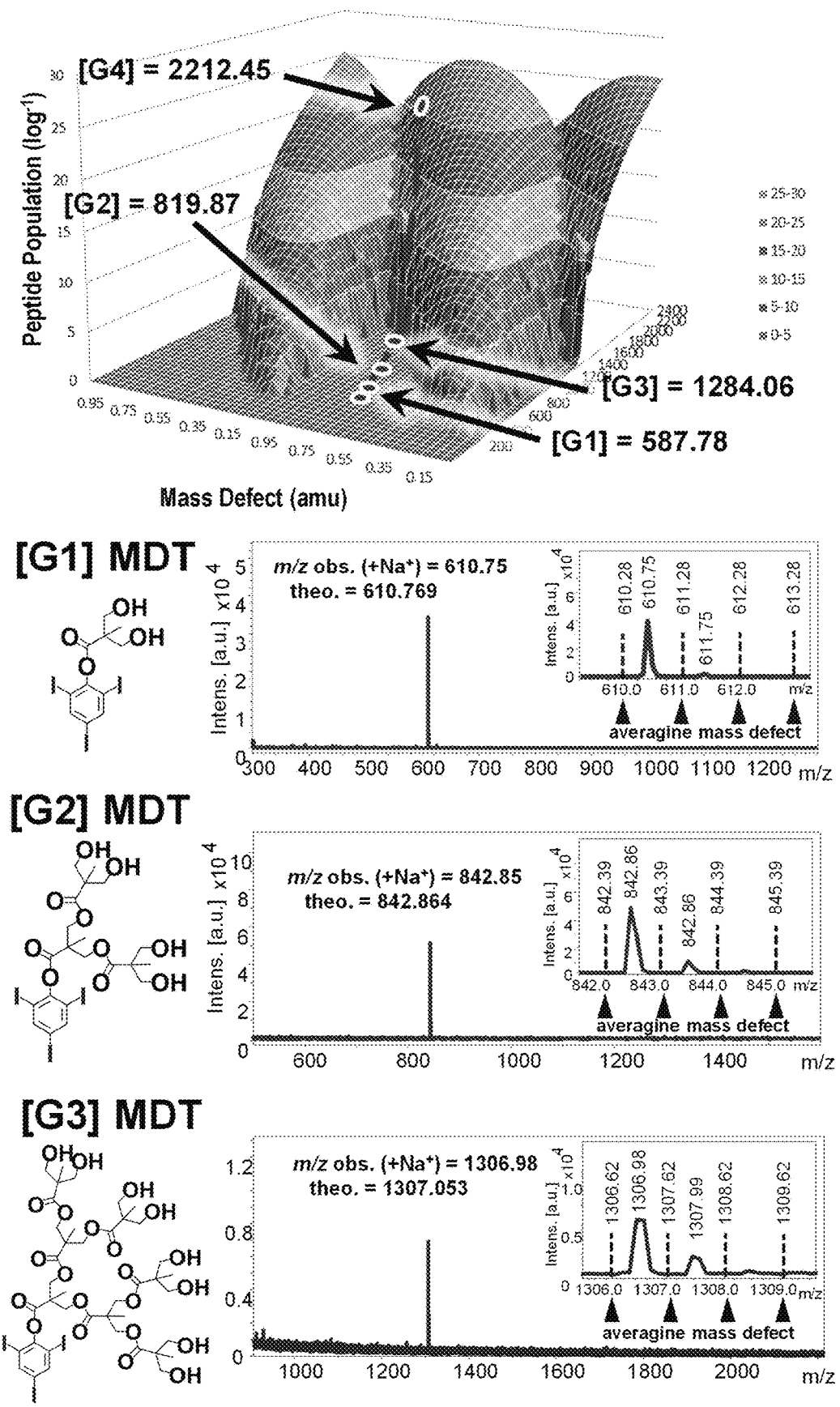
FIG. 9 shows examples of synthetic preparations of dendrimer-based mass-defect calibrants. The mass-defect (MD) calibrants are depicted as overlaid onto a peptide population.
Figure 10:
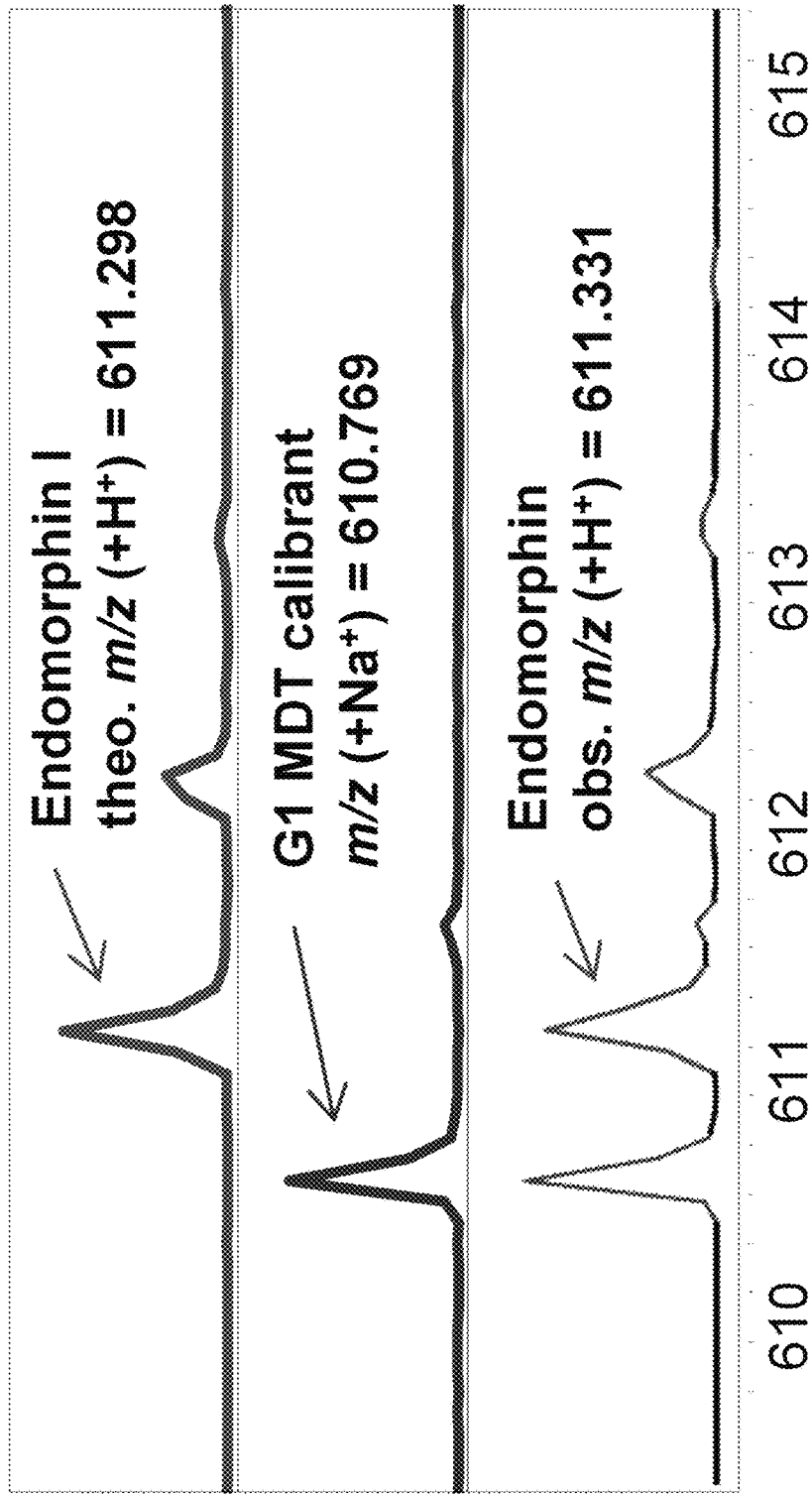
FIG. 10 shows the results of an internal calibration test using a representative peptide, Endomorphin I, (H-Tyr-Pro-Trp-Phe-$NH_2$), $C_{34}H_{38}N_6O_5$. The test shows that dendritic calibrants can be easily tuned to incorporate a tailored mass defect (from triiodophenol) to yield an ideal internal mass-defect calibrant for peptides and protein characterization.
Figure 11:
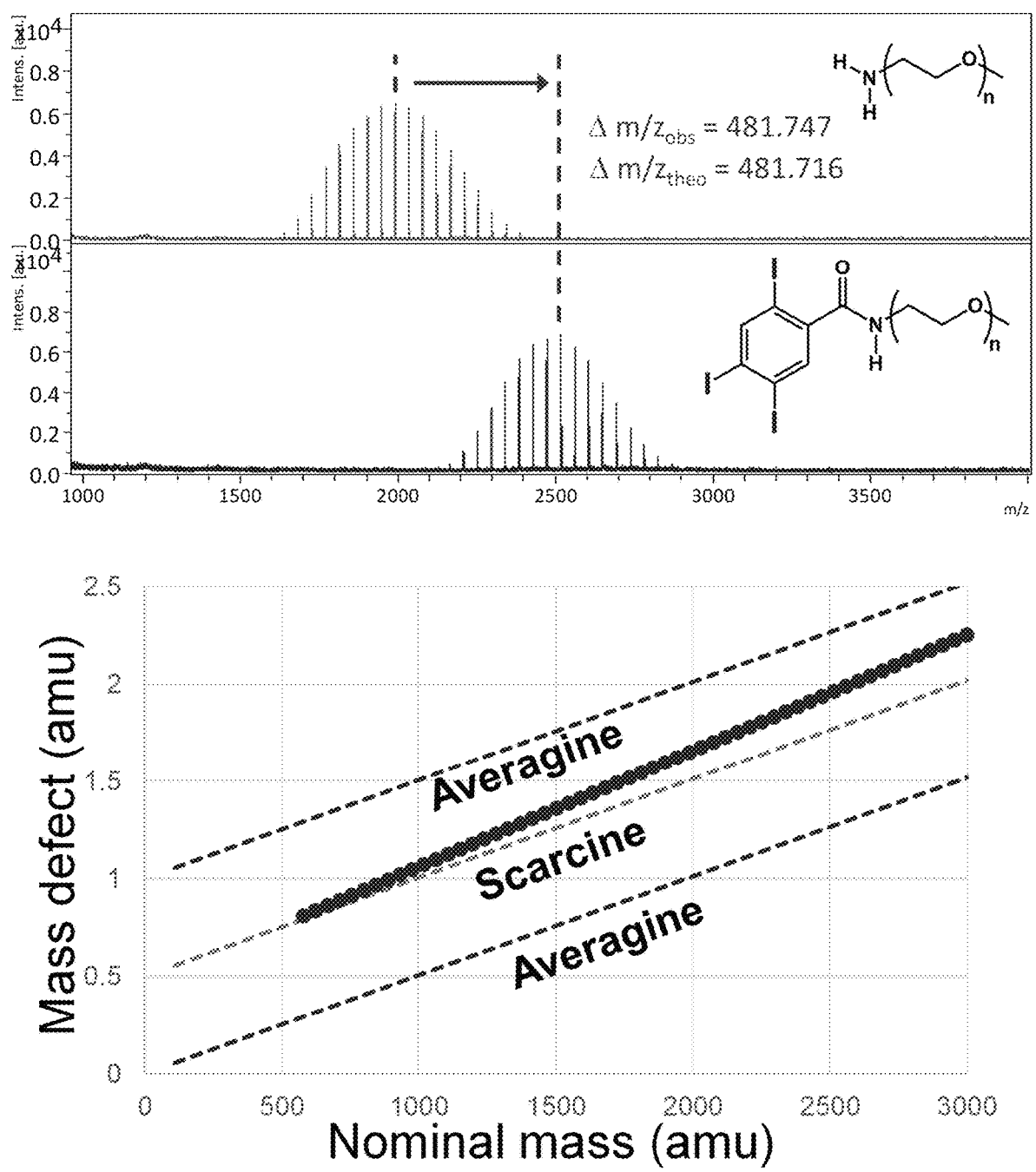
FIG. 11 shows the results of using linear polymers—e.g., PEG—as mass-defect calibrants. Linear polymers are relatively inexpensive and provide numerous calibration points in a specific range. End groups can be modified by active ester coupling. Although the triiodobenzamide end group provides the near ideal mass defect, PEG does not exhibit the same mass defect per repeat unit as averagine, causing the mass defect to deviate from the "scarcine valley" with increasing nominal mass.
Figure 12:
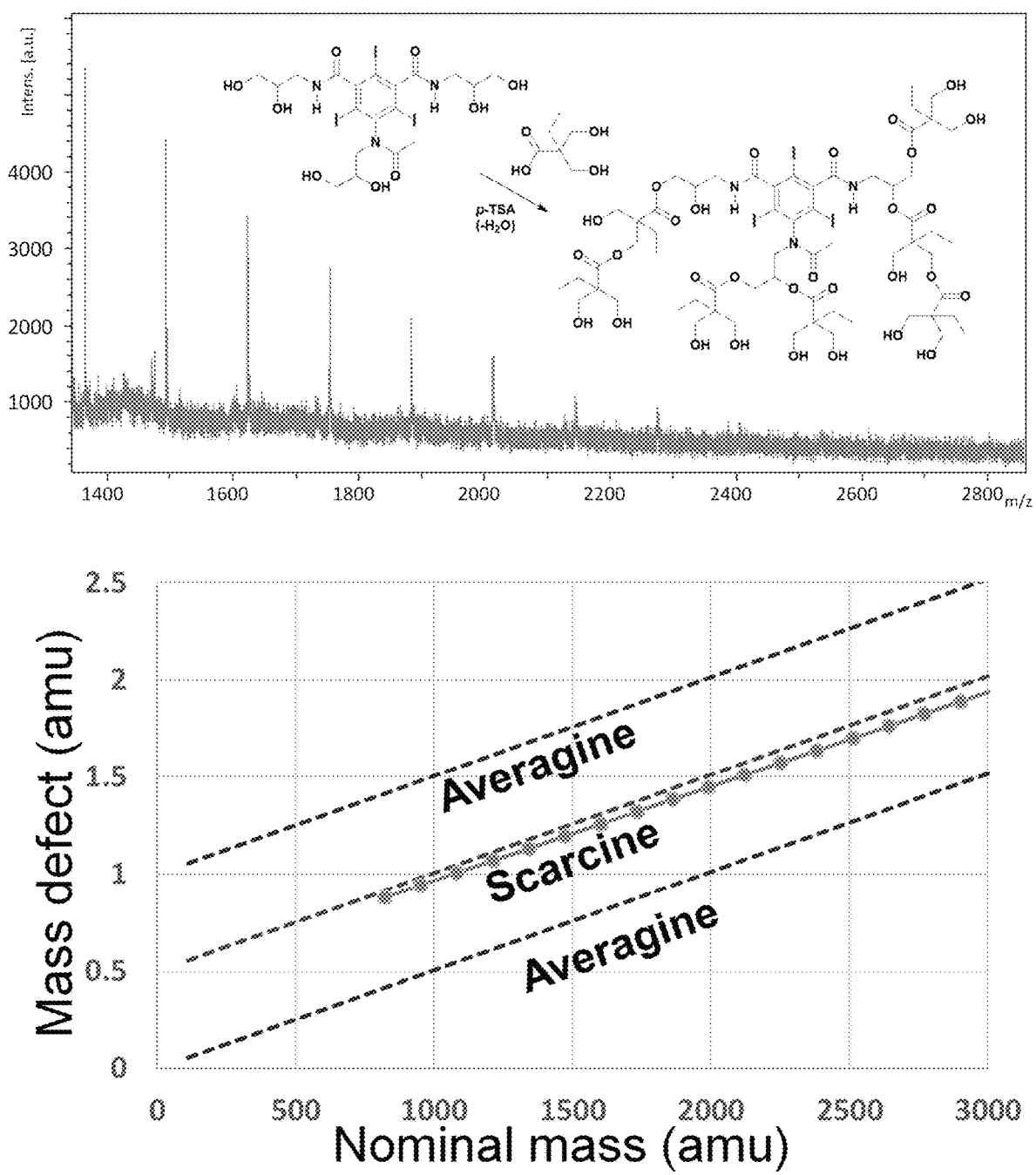
FIG. 12 shows the results of using hyperbranched polymers—e.g., poly(bis-MBA) or poly(bis-(hydroxymethyl) butanoic acid)—as mass-defect calibrants. Hyperbranched polymers can be prepared in one step, though with larger dispersities in their mass distributions. Initiation from a tri-iodo-core can provide the desired mass-defect offset. The mass defect per repeat unit for bis-MBA more closely matches that of averagine, providing a nearly optimal mass-defect offset over a larger mass range.

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate manner.

Wherever any of the phrases "for example," "such as," "including" and the like are used herein, the phrase "and without limitation" is understood to follow unless explicitly stated otherwise. Similarly "an example," "exemplary" and the like are understood to be non-limiting.

The term "substantially" allows for deviations from the descriptor that do not negatively impact the intended purpose. Descriptive terms are understood to be modified by the term "substantially" even if the word "substantially" is not explicitly recited. Therefore, for example, the phrase "wherein the lever extends vertically" means "wherein the lever extends Iodo-functionalized polymers as mass spectrometry calibrants with a mass defect offset substantially vertically" so long as a precise vertical arrangement is not necessary for the lever to perform its function.

The terms "comprising" and "including" and "having" and "involving" (and similarly "comprises", "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a process involving steps a, b, and c" means that the process includes at least steps a, b and c. Wherever the terms "a" or "an" are used, "one or more" is understood, unless such interpretation is nonsensical in context.

Table 1 shows the nominal mass and mass defect for a series of polymer repeating units. For mass defect calibration, it is useful to use a tris-iodo end group to maximize the mass defect offset relative to naturally occurring peptides, while selecting a polymer that has a mass defect per nominal mass slope that is as close to averagine as possible. A number of common polymers are listed along with their "slope shift" relative to averagine (a slope shift of 0 being ideal).

TABLE 1

|  | Formula per repeating unit | Nominal mass | Mass defect | Mass defect/ nominal mass | Slope shift relative to averagine ($\times 10^5$) |
|---|---|---|---|---|---|
| POLYMERS | | | | | |
| averagine |  | 110.9981 | 0.05621 | 0.000506365 |  |
| POLYLACTONES | | | | | |
| polycaprolactone | $C_6H_{10}O_2$ | 114 | 0.06808 | 0.000597193 | 0.90828 |
| polyvalerolactone | $C_5H_8O_2$ | 100 | 0.05243 | 0.0005243 | 0.17935 |
| polybutyrolactone | $C_4H_6O_2$ | 86 | 0.03678 | 0.000427674 | −0.78691 |
| polylactide | $C_6H_8O_4$ | 144 | 0.04226 | 0.000293472 | −2.12893 |
| polyglycolide | $C_4H_4O_4$ | 116 | 0.01096 | 9.44828E−05 | −4.11882 |
| POLYETHERS | | | | | |
| poly(acetal) | $CH_2O$ | 30 | 0.01056 | 0.000352 | −1.54365 |
| poly(ethylene glycol) | $C_2H_4O$ | 88 | 0.05243 | 0.000595795 | 0.894305 |
| poly(propylene glycol) | $C_3H_6O$ | 116 | 0.08373 | 0.00072181 | 2.154453 |
| POLYACRYLATES/ METHACRYLATES/ METHACRYLAMIDES | | | | | |
| poly(methyl acrylate) | $C_4H_6O_2$ | 86 | 0.03678 | 0.000427674 | −0.78691 |
| poly(ethyl acrylate) | $C_5H_8O_2$ | 100 | 0.05243 | 0.0005243 | 0.17935 |
| poly(methyl methacrylate) | $C_5H_8O_2$ | 100 | 0.05243 | 0.0005243 | 0.17935 |
| poly(methoxyethyl acrylate) | $C_6H_{10}O_3$ | 130 | 0.06299 | 0.000484538 | −0.21827 |
| poly(methoxyethyl methacrylate) | $C_7H_{12}O_3$ | 144 | 0.07864 | 0.000546111 | 0.397461 |
| poly(tetrahydropyranyl acrylate) | $C_8H_{12}O_3$ | 156 | 0.07864 | 0.000504103 | −0.02262 |
| polyacrylamide | $C_3H_5NO$ | 71 | 0.03711 | 0.000522676 | 0.163111 |
| polymethacrylamide | $C_4H_7NO$ | 85 | 0.05276 | 0.000620706 | 1.143409 |
| poly(N-methyl acrylamide) | $C_4H_7NO$ | 85 | 0.05276 | 0.000620706 | 1.143409 |
| poly(N-isopropyl acrylamide) | $C_6H_{11}NO$ | 113 | 0.08406 | 0.000743894 | 2.375288 |
| POLYESTER DENDRIMERS | | | | | |
| poly(bis-MPA) dendrimers | $C_5H_8O_3$ | 116 | 0.04734 | 0.000408103 | −0.98262 |
| poly(bis-MBA) dendrimers | $C_6H_{10}O_3$ | 130 | 0.06299 | 0.000484538 | −0.21827 |
| POLYSTYRENICS | | | | | |
| Polystyrene | $C_8H_8$ | 104 | 0.0626 | 0.000601923 | 0.955581 |
| poly(methoxystyrene) | $C_9H_{10}O$ | 134 | 0.07316 | 0.00054597 | 0.396051 |
| poly(dimethoxystyrene) | $C_{10}H_{12}O_2$ | 164 | 0.08373 | 0.000510549 | 0.041838 |
| POLY(AMINO ACIDS) | | | | | |
| polyalanine | $C_3H_5NO$ | 71 | 0.03711 | 0.000522676 | 0.163111 |
| polyproline | $C_6H_9NO$ | 111 | 0.06841 | 0.000616306 | 1.099413 |
| polyphenylalanine | $C_9H_9NO_2$ | 147 | 0.06841 | 0.000465374 | −0.40991 |
| polytyrosine | $C_9H_9NO_2$ | 163 | 0.06333 | 0.000388528 | −1.17837 |

TABLE 1-continued

|  | Formula per repeating unit | Nominal mass | Mass defect | Mass defect/ nominal mass | Slope shift relative to averagine ($\times 10^5$) |
|---|---|---|---|---|---|
| polyglycine | $C_2H_3NO$ | 57 | 0.02146 | 0.000376491 | −1.29874 |
| polyaspargine | $C_4H_6N_2O_2$ | 114 | 0.04293 | 0.000376579 | −1.29786 |
| polythreonine | $C_4H_7NO_2$ | 101 | 0.04768 | 0.000472079 | −0.34286 |
| polytryptophan | $C_{11}H_{10}N_2O$ | 186 | 0.07931 | 0.000426398 | −0.79967 |
| polymethionine | $C_5H_{11}NO_2S$ | 149 | 0.05105 | 0.000342617 | −1.63748 |
| polyglutamine | $C_5H_8N_2O_2$ | 128 | 0.05858 | 0.000457656 | −0.48709 |

Examples

Addition of Triiodophenyl Group Via Activated Ester Coupling

Figure 13:
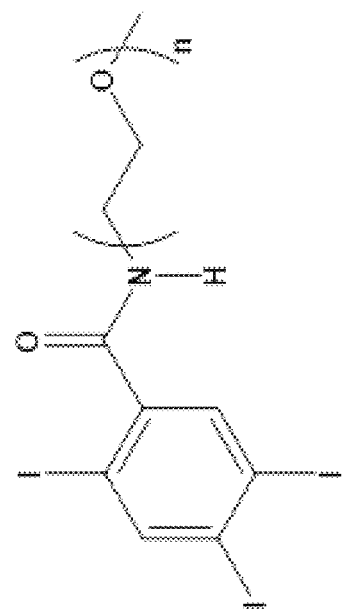
FIG. 13 shows general amidation reaction of mono-amino functionalized polymers with triiodobenzoic acid.
Figure 13:
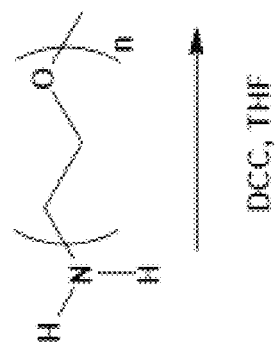
Figure 13:
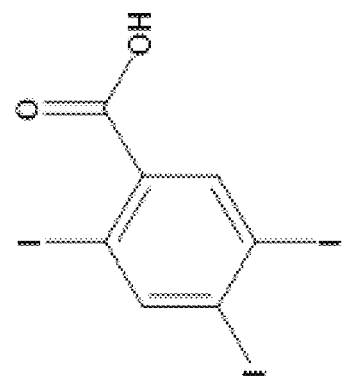

The following protocol, though demonstrated for PEG, can be applied to a wide range of polymers that contain a single amino functionality or hydroxyl functionality. Such polymers include: poly(ethylene glycol)s, poly(propylene glycol)s, polyesters (polycaprolactones, polyvalerolactones, polybutyrolactone, polylactide, etc.), polyamides (including synthetic polyamides, such as nylons, polypropiolactam, polybutyrolactam, poly(N-isopropylacrylamide) polyphthalamids, and polyaramids, as well as biologically relevant polyamides such as peptides and proteins), polyacrylates (such as poly(methylacrylate), poly(ethylacrylate), etc.) polymethacrylates (such as poly(methyl methacrylate), poly(ethyl methacrylate), etc.) polystyrenics (including polystyrene, poly(methoxystyrene) and poly(dimethoxystyrene)), etc. See FIG. 13.

Triiodobenzamide Modification of Amino Functional Poly(Ethylene Glycol) $M_n$ 2000

Figure 14:
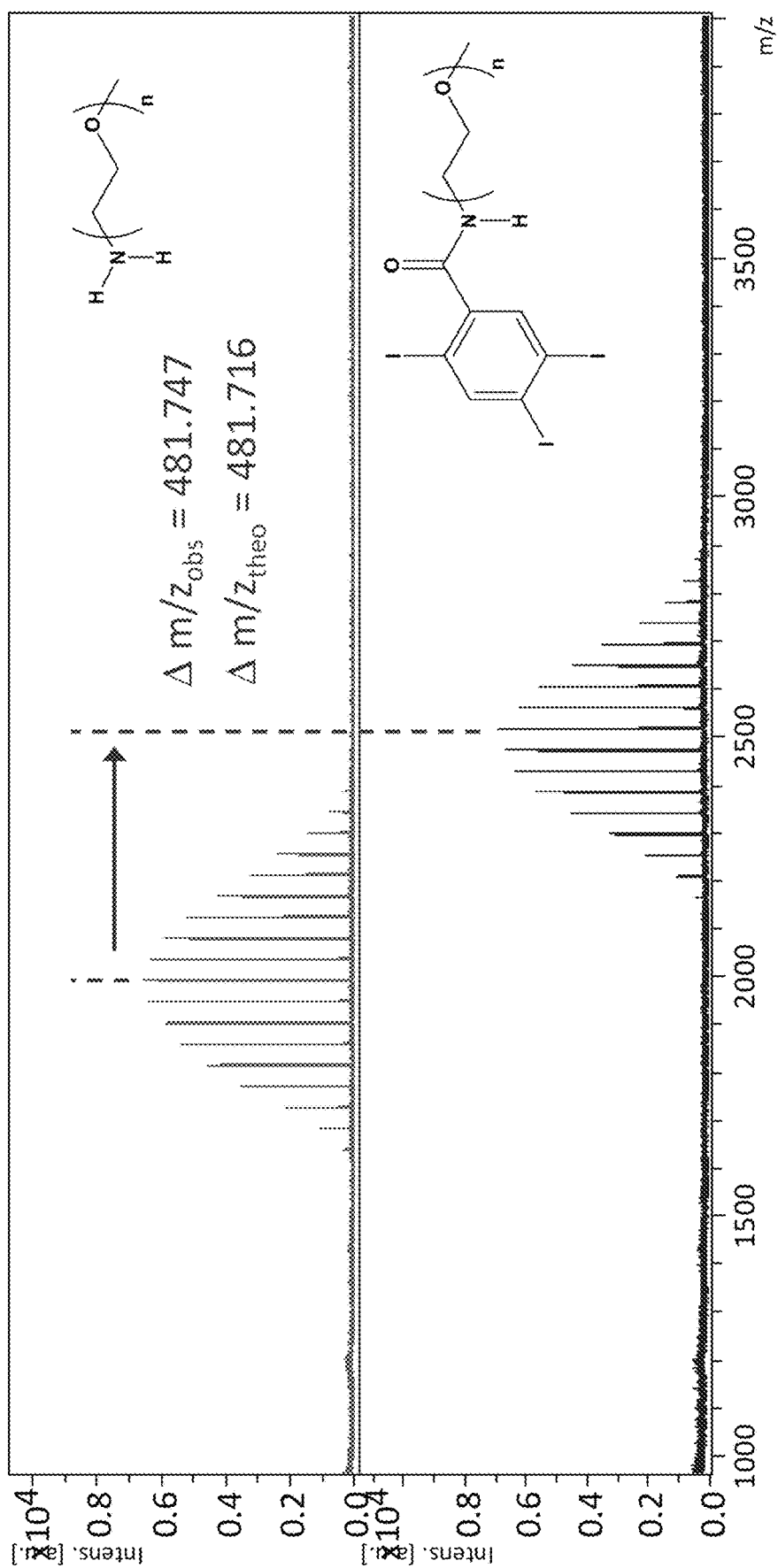
FIG. 14 shows MALDI-TOF MS data for the amidation of amino-functionalized PEG ($M_n$=2000) with triiodobenzoic acid: starting material (above) and amidation product (below).

To a 100 mL round-bottomed flask, 10 equivalents of 2,3,5-triiodobenzoic acid (100 mg) (Aldrich) and 15 equivalents of dicyclohexylcarbodiimide (30 mg) (Aldrich) were added to 10 mL of THF and stirred for 30 minutes. 1 equivalent (20 mg) of α-methyoxy, ω-amino poly(ethylene glycol) $M_n$~2000 was added and the reaction was allowed to stir for 12 h. MALDI-TOF MS confirmed that the reaction was complete, demonstrating the expected mass shift in the polymer distribution. The sample was worked up by allowing the DCU byproduct to settle, decanting off the solvent, and extracting twice with 1M aq. $NaHCO_3$, and then removing solvent, in vacuo. See FIG. 14.

Triiodobenzamide Modification of Amino Functional Poly(Ethylene Glycol) $M_n$ 5000

Figure 15:
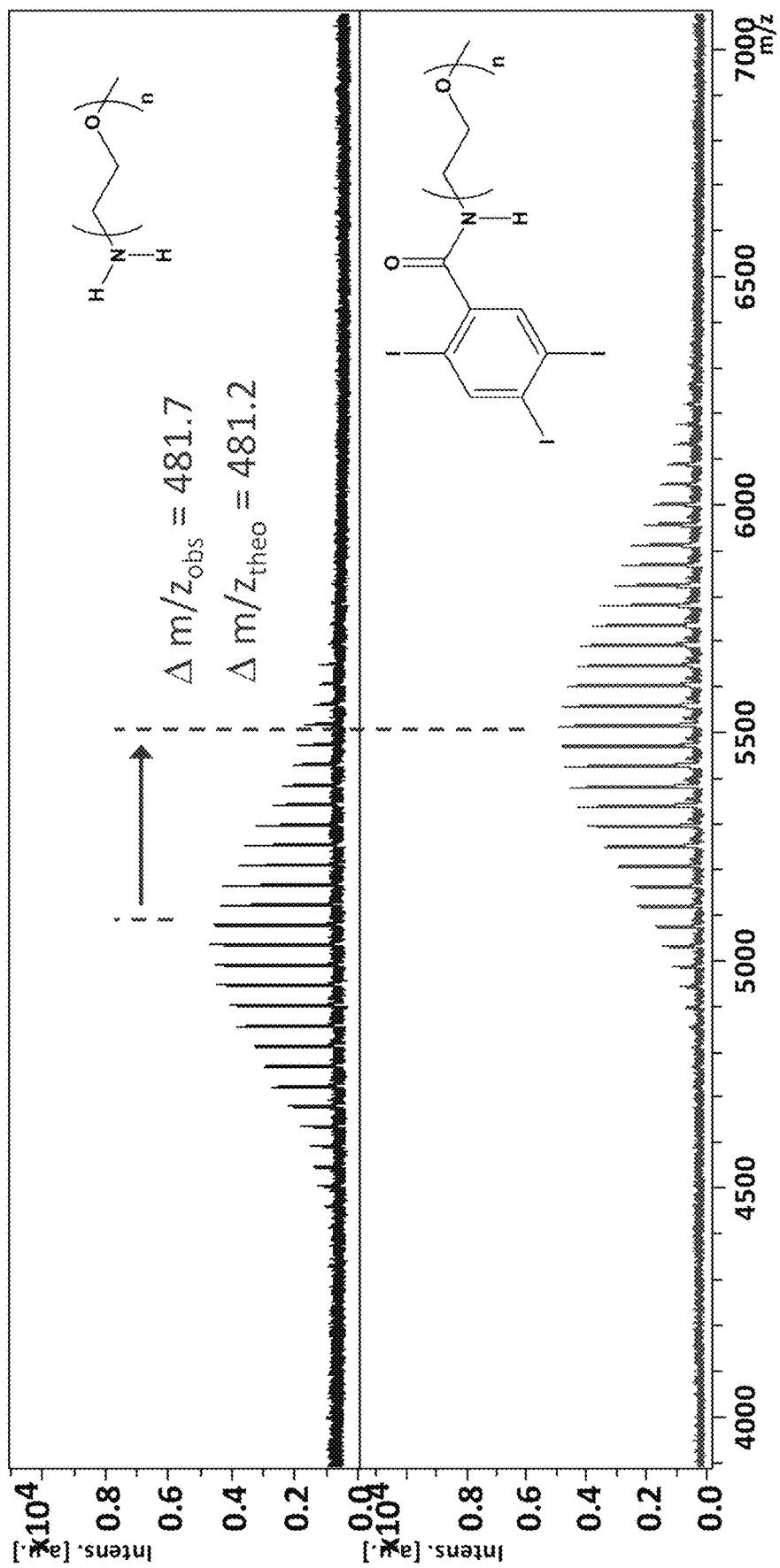
FIG. 15 shows MALDI-TOF MS data for the amidation of amino-functionalized PEG ($M_n$=5000) with triiodobenzoic acid: starting material (above) and amidation product (below).

The $M_n$~5000 product was prepared following an identical procedure as above, but substituting 20 mg of α-methyoxy, ω-amino poly(ethylene glycol) $M_n$~2000 with 50 mg of α-methyoxy, ω-amino poly(ethylene glycol) $M_n$~5000. See FIG. 15.

Triiodobenzamide Modification of Amino Functional Polystyrene or Modified Polystyrene of $M_n$ 2000

Amino terminated poly(3,4-dimethoxystyrene) could be prepared via the protocol of Matyjaszewski et al. The attachment of a triiodobenzamide group could be carried out following an identical procedure as above, but substituting 20 mg of α-methyoxy, ω-amino poly(ethylene glycol) $M_n$~2000 with 20 mg of ω-amino poly(3,4-dimethoxystyrene) $M_n$~2000.

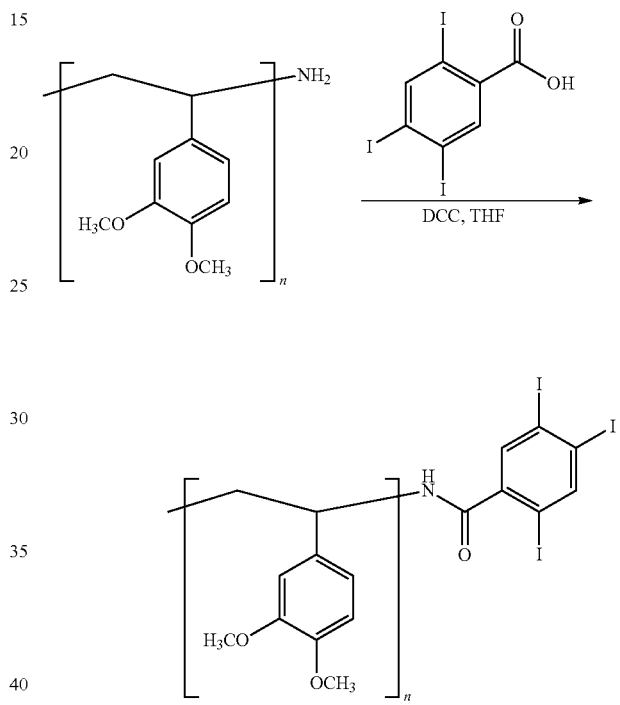

Triiodobenzamide Modification of Amino Functional Polyacrylate or Poly Methacrylate of $M_n$ 2000

Amino terminated poly(ethyl acrylate) could be prepared via the polymerization by Datta et al. and end group modification. The attachment of a triiodobenzamide group could be carried out following an identical procedure as the PEG protocol above, but substituting 20 mg of α-methyoxy, ω-amino poly(ethylene glycol) $M_n$~2000 with 20 mg of ω-amino poly(ethyl acrylate) $M_n$~2000.

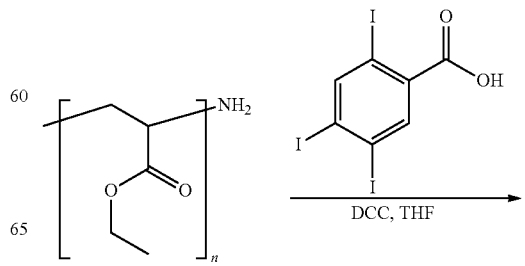

-continued

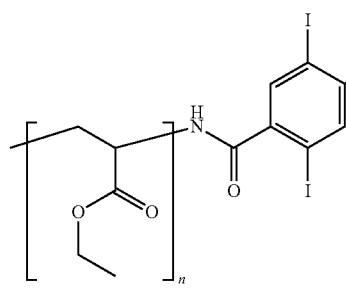

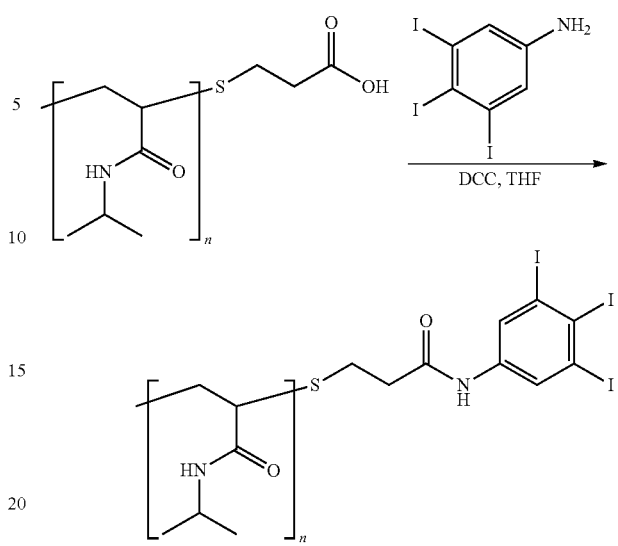

Triiodobenzamide Modification of Amino Functional Poly(Amino Acid) of $M_n$ 2000

Amino terminated polyalanine could be modified to include a triiodo group via coupling of triiodobenzoic acid following an identical procedure as the PEG protocol above, but substituting 20 mg of α-methyoxy, ω-amino poly(ethylene glycol) $M_n$~2000 with 20 mg of ω-amino poly(alanine) $M_n$~2000.

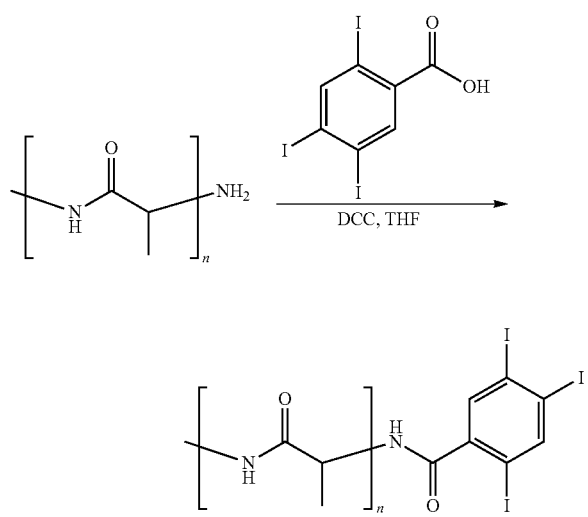

Addition of Triiodoaniline Group Via Grafting to a Carboxylic Acid Terminated Polymer The following protocol, though demonstrated for poly(N-isopropylacrylamide), is equally applicable to a wide range of mono-carboxylic acid terminated polymers or peptides with a single unprotected carboxylic acid group.

Triiodophenylacetamide Functionalization of Poly(N-Isopropylacrylamide) Bearing a Terminal Carboxylic Acid.

To a 100 mL round-bottomed flask, 10 equivalents of 3,4,5-triiodoaniline (100 mg) (Aldrich) and 15 equivalents of dicyclohexylcarbodiimide (30 mg) (Aldrich) were added to 10 mL of chloroform and stirred for 30 minutes. 1 equivalent (20 mg) of ω-carboxylic acid poly(N-isopropylacrylamide) $M_n$~2000 was added and the reaction was allowed to stir for 12 h. MALDI-TOF MS confirmed that the reaction was complete, demonstrating the expected mass shift in the polymer distribution. The sample was worked up by allowing the DCU byproduct to settle, decanting off the solvent, and extracting twice with 1M aq. $NaHCO_3$, and removing the solvent in vacuo.

Addition of Triiodophenyl Group Via Grafting from Triodoinitiator

The following protocol, though demonstrated for bis-MBA, is equally applicable to a wide range of polymers polymerize off of a single alcohol or amino functionality.

Hyperbranched Polymerization of Bis-Hydroxymethyl Butanoic Acid (Bis-MBA) from Triodinated Core: Histodenz™

Figure 16:
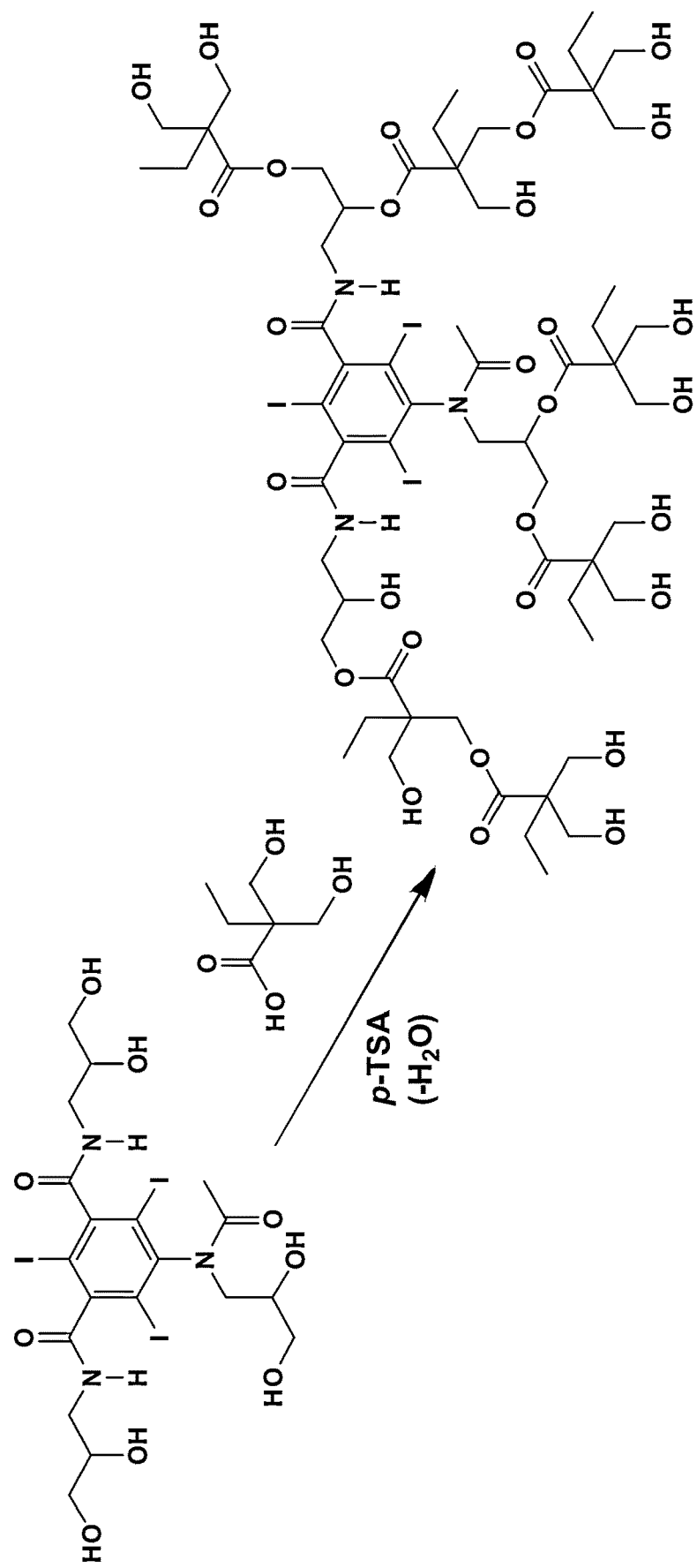
FIG. 16 shows general scheme of hyperbranched polymerization of bis-MBA from a triiodo core.
Figure 17:
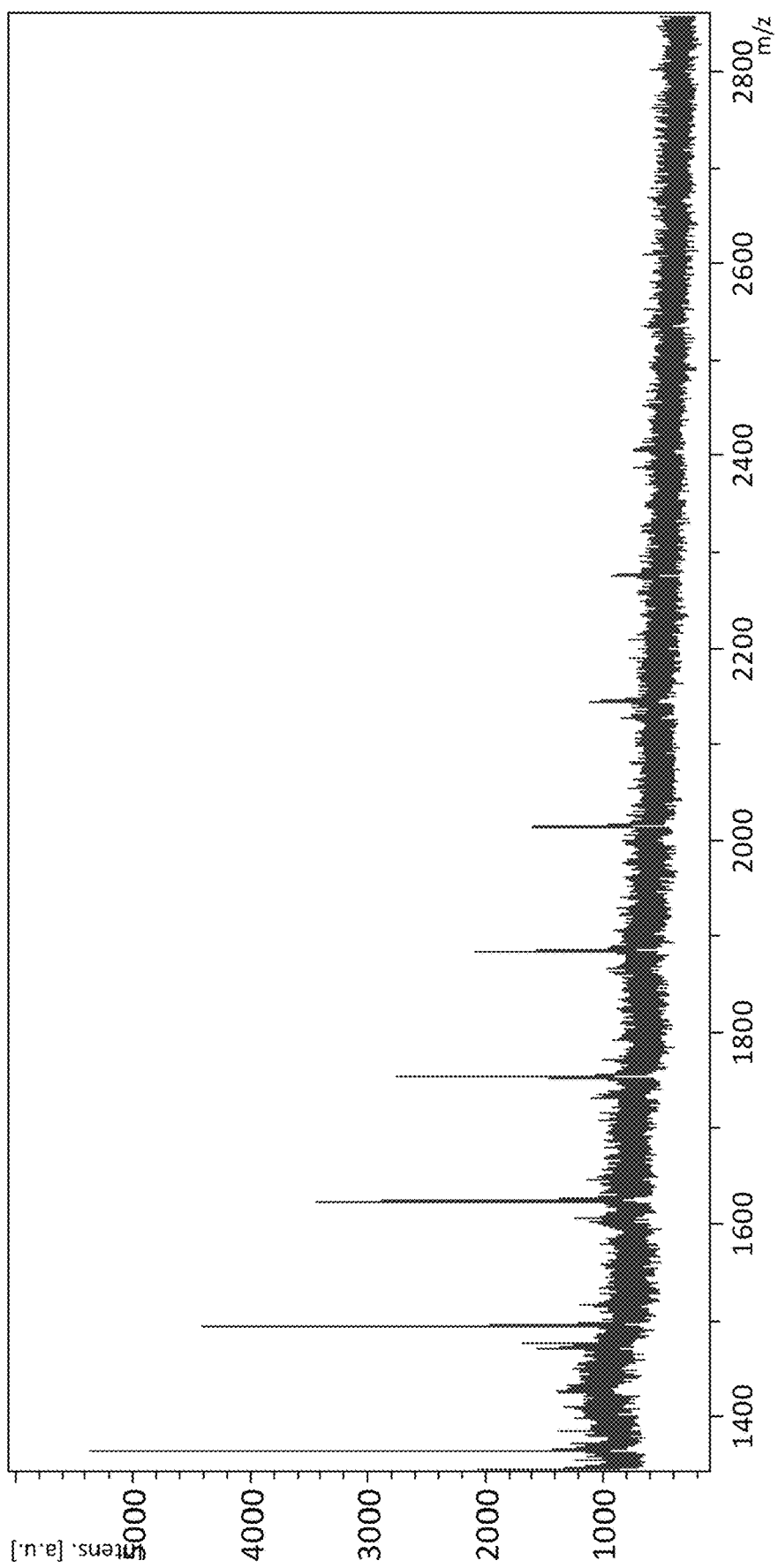
FIG. 17 shows MALDI-TOF MS data for the hyperbranched polymer grafted off of a triiodo core.

Heat a bath of Lab Armor™ beads to 120° C. Set up and equip a 3-neck round bottom flask with a magnetic stir bar, flowing inert gas, solid addition funnel, and a $CaCl_2$) drying tube. Add 1 equivalent (1 g, 1.2 mmol) of HistoDenz™ and 0.5% wt. of core (0.01 g) of para-toluenesulfonic acid monohydrate (p-TsOH) to the 3-neck flask. Add 17 equivalents of 2,2-bis(hydroxymethyl)butanoic acid (bis-MBA) to the solid addition funnel and slowly add to the flask at a rate of approximately 3 turns per 5 minutes. Once all of the bis-MBA has been added to the flask allow to stir at high heat over night. Cool the reaction and immediately dissolve in THF. See FIG. 16.

Hyperbranched Polymerization of Bis-Hydroxymethyl Butanoic Acid (Bis-MBA) from Triodinated Core: 2,4,6-Triodophenol Using the same procedure as above, but substituting 1.2 mol of 2,4,6-triodophenol for 1.2 mol of Histodenz™.

In one embodiment, the present invention provides a composition comprising, consisting essentially of, or consisting of 1-5 iodo functional groups attached to a polymer. As is understood in the art, an iodo functional group is a functional group that is iodine. In an embodiment, the present invention provides a composition comprising, consisting essentially of, or consisting of 1-5 iodo functional groups attached to a polymer selected from the group consisting of a linear polymer, a hyperbranched polymer, and a biological polymer. In an embodiment, the present invention provides methods for making said compositions.

Monoiodo compounds include: 2-iodophenol, 3-iodophenol, 4-iodophenol, 2-iodobezoic acid, 3-iodobezoic acid, 4-iodobezoic acid, 2-iodoaniline, 3-iodoaniline, and 4-iodoaniline, Diiodo compounds include: 2,3-diiodophenol, 2,4-diiodophenol, 2,5-diiodophenol, 2,6-diiodophenol, 3.4-diiodophenol, 3,5-diiodophenol, 2,3-diiodobenzoic acid, 2,4-diiodobenzoic acid, 2,5-diiodobenzoic acid, 2,6-diiodobenzoic acid, 3.4-diiodobenzoic acid, 3,5-diiodobenzoic acid, 2,3-diiodoaniline, 2,4-diiodoaniline, 2,5-diiodoaniline, 2,6-diiodoaniline, 3.4-diiodoaniline, 3,5-diiodoaniline.

Triiodo compounds include: 2,3,4-triiodophenol, 2,3,5-triiodophenol, 2,3,6-triiodophenol, 2,4,6-triiodophenol, 3,4,5-triiodophenol, 2,3,4-triiodo benzoic acid, 2,3,5-triiodo benzoic acid, 2,3,6-triiodo benzoic acid, 2,4,6-triiodo benzoic acid, 3,4,5-triiodo benzoic acid, 2,3,4-triiodoaniline, 2,3,5-triiodoaniline, 2,3,6-triiodoaniline, 2,4,6-triiodoaniline, 3,4,5-triiodoaniline, iotalamic acid, iopentol, ioversol, ioxilan, diatrizoic acid, thyroxine, iopanic acid, iopromide, and iopamidol.

Tetraiodo compounds include: 2,3,4,5-tetraiodophenol, 2,3,4,6-tetraiodophenol, 2,3,5,6-tetraiodophenol, 2,3,4,5-tetraiodobenzoic acid, 2,3,4,6-tetraiodobenzoic acid, 2,3,5,6-tetraiodobenzoic acid, 2,3,4,5-tetraiodoaniline, 2,3,4,6-tetraiodoaniline, 2,3,5,6-tetraiodoaniline Pentaiodo compounds include: 2,3,4,5,6-pentaiodophenol, 2,3,4,5,6-pentaiodobezoic acid, and 2,3,4,5,6-pentaiodoaniline, In some embodiments, the composition is used as a mass spectrometry calibrant.

In an embodiment, the present invention provides a composition comprising, consisting essentially of, or consisting of 1 iodo functional group attached to a polymer. In an embodiment, the present invention provides a composition comprising, consisting essentially of, or consisting of 2 iodo functional groups attached to a polymer. In an embodiment, the present invention provides a composition comprising, consisting essentially of, or consisting of 3 iodo functional groups attached to a polymer. In an embodiment, the present invention provides a composition comprising, consisting essentially of, or consisting of 4 iodo functional groups attached to a polymer. In an embodiment, the present invention provides a composition comprising, consisting essentially of, or consisting of 5 iodo functional groups attached to a polymer.

In an embodiment, a composition of the present invention is formed by modifying an iodo-functionalized compound with a preformed polymer. In an embodiment, the iodo-functionalized compound contains 1, 2, 3, 4, or 5 iodo functional groups. In an embodiment, the preformed polymer contains a single amino functionality, hydroxyl functionality, or carboxylic acid functionality.

In another embodiment, a composition of the present invention is formed by grafting a polymer from an iodo-functionalized compound. In an embodiment, the iodo-functionalized compound contains 1, 2, 3, 4, or 5 iodo functional groups. In an embodiment, the iodo-functionalized compound is alcohol or amine.

In an embodiment, the present invention provides a composition comprising, consisting essentially of, or consisting of 1 iodo functional group attached to a polymer selected from the group consisting of a linear polymer, a hyperbranched polymer, and a biological polymer. In an embodiment, the present invention provides a composition comprising, consisting essentially of, or consisting of 2 iodo functional groups attached to a polymer selected from the group consisting of a linear polymer, a hyperbranched polymer, and a biological polymer. In an embodiment, the present invention provides a composition comprising, consisting essentially of, or consisting of 3 iodo functional groups attached to a polymer selected from the group consisting of a linear polymer, a hyperbranched polymer, and a biological polymer. In an embodiment, the present invention provides a composition comprising, consisting essentially of, or consisting of 4 iodo functional groups attached to a polymer selected from the group consisting of a linear polymer, a hyperbranched polymer, and a biological polymer. In an embodiment, the present invention provides a composition comprising, consisting essentially of, or consisting of 5 iodo functional groups attached to a polymer selected from the group consisting of a linear polymer, a hyperbranched polymer, and a biological polymer. In another embodiment, the present invention provides methods of making said compositions.

In an embodiment, the polymer is PEG. In another embodiment, the polymer is poly(bis-MBA).

In an embodiment, the invention provides a method of determining physical properties of a sample, the method comprising:
  providing a composition as previously described;
  ionizing at least a portion of said composition;
  providing an analyte sample wherein said analyte sample has physical properties;
  ionizing at least a portion of said analyte;
  collecting data from said ionized portion of said composition and said ionized portion of said analyte sample; and
  relating said data to said physical properties of said portion of said composition, thereby determining said physical properties of said analyte sample.

Non-limiting examples of "physical properties," as described herein, may include mass/charge ratio, molecular mass, collisional cross section, hydrodynamic radius, and radius of gyration.

In an embodiment, the invention provides a method of determining molecular mass of a sample, the method comprising:
  providing a composition as previously described;
  ionizing at least a portion of said composition;
  providing an analyte sample wherein said analyte sample has molecular mass;
  ionizing at least a portion of said analyte;
  collecting data from said ionized portion of said composition and said ionized portion of said analyte sample; and
  relating said data to said molecular mass of said portion of said composition, thereby determining said molecular mass of said analyte sample.

In an embodiment, the invention provides a method of calibrating a mass spectrometer, the method comprising:
  providing a composition as previously described;
  ionizing at least a portion of said composition;
  collecting data from said ionized portion of said composition; and
  relating said data to said physical properties. Relating said data to said properties enables calibration of the mass scale of said mass spectrometer.

REFERENCES

All references cited herein are incorporated by reference in their entireties.

Anacleto, J. F., Pleasance, S., Boyd, R. K.: Calibration of ion spray mass spectra using cluster ions. Org. Mass Spectrom. 27, 660-666 (1992).

Bajrami, B., Shi, Y., Lapierre, P., Yao, X.: Shifting unoccupied spectral space in mass spectrum of peptide fragment ions. J. Am. Soc. Mass Spectrom. 20, 2124-2134 (2009).

Casey, B. K., Grayson, S. M.: The potential of amine-containing dendrimer mass standards for internal calibration of peptides. Eur. J. Mass Spectrom. 21, 747-752 (2015).

Cody, R. B., Tamura, J., Musselman, Electrospray ionization/magnetic sector mass spectrometry: Calibration, resolution, and accurate mass measurements. Anal. Chem. 64, 1561-1570 (1992).

Datta, H.; Bhowmick, A. K.; Singh, N. K. Macromol. Symp. 2006, 240, 245-251.

Dole, M., Mack, L. L., Hines, R. L., Mobley, R. C., Ferguson, L. D., Alice, M. B.: Molecular beams of macroions. J. Chem. Phys. 49, 2240-2249 (1968).

Fishman, V. N., Linclau, B., Curran, D. P., Somayajula, K. V.: Tris(perfluoroalkylethyl)silyl alkyl amines as calibration standards for electron ionization mass spectrometry in the mass range of 100-3000 Da. J. Am. Soc. Mass Spectrom. 12, 1050-1054 (2001).

Gillies, E. R., Fréchet, J. M. J.: Designing macromolecules for therapeutic applications: polyester dendrimers-poly (ethylene oxide) "bow-tie" hybrids with tunable molecular weight and architecture. J. Am. Chem. Soc. 124, 14137-14146 (2002).

Grayson, S. M., Myers, B. K., Bengtsson, J., Malkoch, M.: Advantages of monodisperse and chemically robust "SpheriCal" polyester dendrimers as a "universal" MS calibrant. J. Am. Soc. Mass Spectrom. 25, 303-309 (2014).

Gross, J. H.: Improved procedure for dendrimer-based mass calibration in matrix-assisted laser desorption/ionization-time-of-flight-mass spectrometry. Anal. Bioanal. Chem. 408, 5945-5951 (2016).

Hop, C. E. C. A.: Generation of high molecular weight cluster ions by electrospray ionization: implications for mass calibration. J. Mass Spectrom. 31, 1314-1316 (1996).

Ihre, H., Hult, A., Fréchet, J. M. J., Gitsov, I.: Double-stage convergent approach for the synthesis of functionalized dendritic aliphatic polyesters based on 2,2-bis(hydroxymethyl)propionic acid. Macromolecules. 31, 4061-4068 (1998).

Ihre, H., Padilla de Jesus, O. L., Fréchet, J. M. J.: Fast and convenient divergent synthesis of aliphatic ester dendrimers by anhydride coupling. J. Am. Chem. Soc. 123, 5908-5917 (2001).

Karas, M., Bachmann, D., Hillenkamp, F.: Influence of the wavelength in high-irradiance ultraviolet laser desorption mass spectrometry of organic molecules. Anal. Chem. 57, 2935-2939 (1985).

Konig, S., Fales, H. M.: Calibration of mass ranges up to m/z 10,000 in electrospray mass spectrometers. J. Am. Soc. Mass Spectrom. 10, 273-276 (1999).

Malkoch, M., Malmstrom, E., Hult, A.: Rapid and efficient synthesis of aliphatic ester dendrons and dendrimers. Macromolecules. 35, 8307-8317 (2002).

Matyjaszewski, K.; Nakagawa, Y.; Gaynor, S. G. *Macromol. Rapid Commun.* 1997, 18, 1057.

McEwen, C. N., Larsen, B. S.: Accurate mass measurement of proteins using electrospray ionization on a magnetic sector instrument. Rapid Commun. Mass Spectrom. 6, 173-178 (1992).

Moini, M., Jones, B. L., Rogers, R. M., Jiang, L.: Sodium trifluoroacetate as a tune/calibration compound for positive- and negative-ion electrospray ionization mass spectrometry in the mass range of 100-4000 Da. J. Am. Soc. Mass Spectrom, 9, 977-980 (1998).

Pleasance, S., Thibault, P., Sim, P. G., Boyd, R. K.: Cesium iodide clusters as mass calibrants in ionspray mass spectrometry. Rapid Commun. Mass Spectrom. 5, 307-308 (1991).

Schreimer, D. C., Li, L.: Detection of high molecular weight narrow polydisperse polymers up to 1.5 million Daltons by MALDI mass spectrometry. Anal. Chem. 68, 2721-2725 (1996).

Shi, Y., Bajrami, B., Yao. X.: Passive and active fragment ion mass defect labelling: distinct proteomic potential of iodine-based reagents. Anal. Chem. 81, 6438-6448 (2009).

Yamashita, M., Fenn, J. B.: Electrospray ion source. Another variation on the free-jet theme. J. Phys. Chem. 88, 4451-4459 (1984).

Yao, X., Diego, P., Ramos, A. A., Shi, Y.: Averagine-scaling analysis and fragment ion mass defect labeling in peptide mass spectrometry, Anal. Chem. 80, 7383-7391 (2008).

What is claimed is:

1. A composition comprising:
    a polymer,
    wherein said polymer is poly(bis-MBA) or poly(dimethoxystyrene); and
    between one and five iodo functional groups are attached to the polymer.

2. The composition of claim 1, wherein the composition comprises three iodo functional groups.

3. A composition comprising between one and five iodo functional groups attached to a polymer.

4. The composition of claim 3, wherein the three iodo functional groups are attached to the polymer.

5. The composition of claim 1, wherein said polymer is a hyperbranched polymer.

6. The composition of claim 1, wherein said polymer is a linear polymer.

7. The composition of claim 1, wherein said composition is formed by modifying an iodo-functionalized compound with the polymer.

8. The composition of claim 7, wherein the polymer is a preformed polymer.

9. The composition of claim 1, wherein said composition is formed by grafting a polymer from an iodo-functionalized compound.

10. The composition of claim 9, wherein the iodo-functionalized compound is alcohol, amine or carboxylic acid.

11. A method of determining physical properties of a sample, the method comprising:
    providing the composition of claim 1;
    ionizing at least a portion of said composition;
    providing an analyte sample,
    wherein said analyte sample has physical properties;
    ionizing at least a portion of said analyte;
    collecting data from said ionized portion of said composition and said ionized portion of said analyte sample; and
    relating said data to said physical properties of said portion of said composition,
    thereby determining said physical properties of said analyte sample.

12. A method of calibrating a mass spectrometer, the method comprising:
    providing the composition of claim 1;
    ionizing at least a portion of said composition;
    collecting data from said ionized portion of said composition; and
    relating said data to physical properties of said composition.

13. The method of claim 11, wherein said physical properties comprise mass/charge ratio.

* * * * *